Oct. 20, 1964 T. FOSTER ETAL 3,153,359
STYLUS ADJUSTING MEANS
Original Filed Feb. 1, 1957
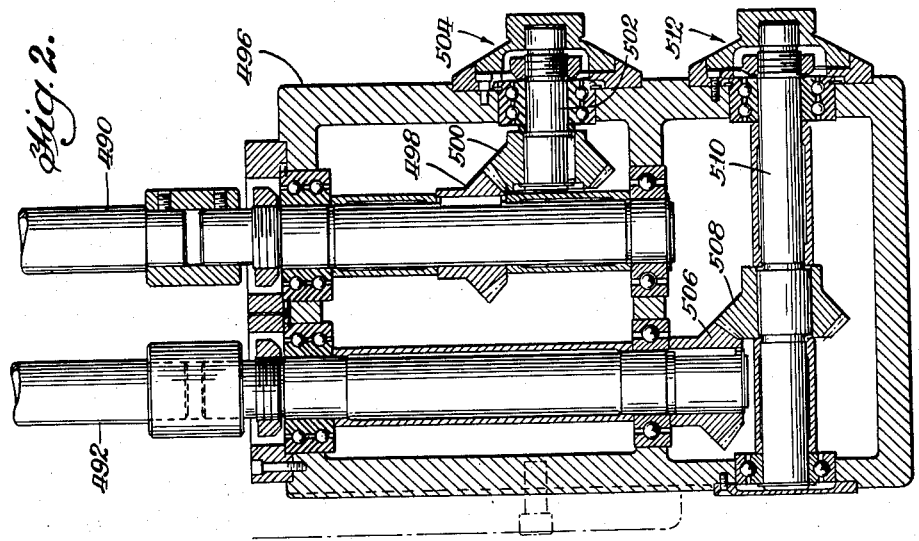
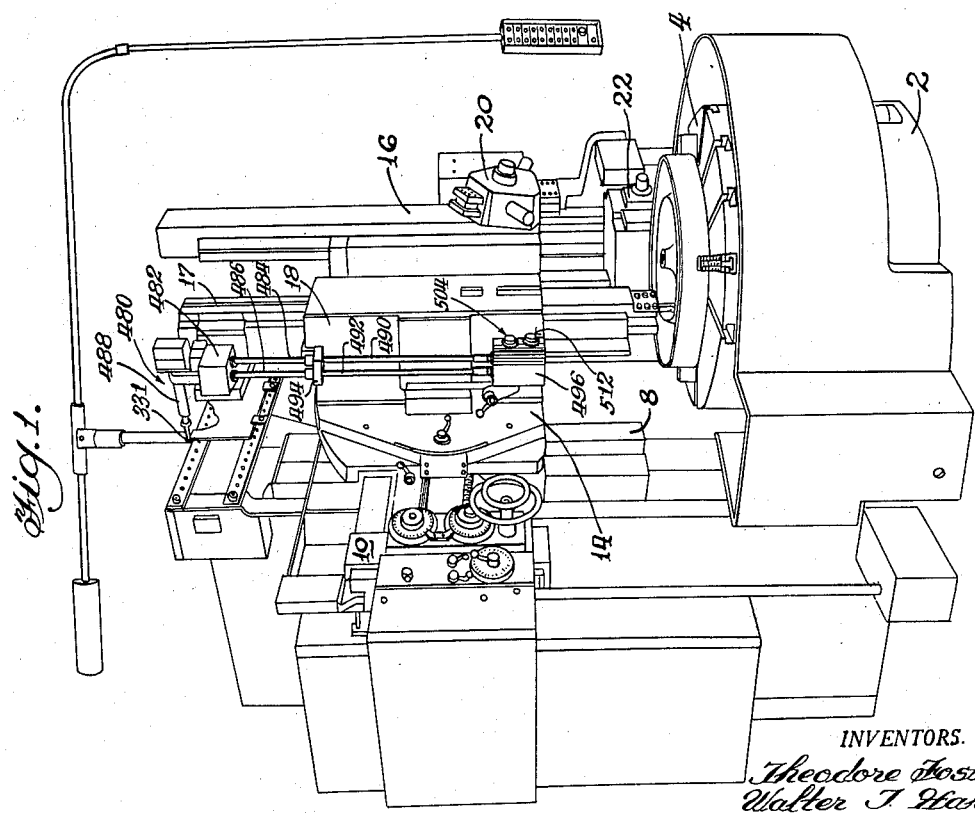
INVENTORS.
Theodore Foster
Walter T. Hake
Witness:
Ralph M. Faust
By Walter J. Schlegel, Jr. Atty.

United States Patent Office 3,153,359
Patented Oct. 20, 1964

3,153,359
STYLUS ADJUSTING MEANS
Theodore Foster, Montgomery, and Walter T. Hake, White Oak, Ohio, assignors, by mesne assignments, to The G. A. Gray Company, Cincinnati, Ohio, a corporation of Ohio
Original application Feb. 1, 1957, Ser. No. 637,810. Divided and this application May 13, 1960, Ser. No. 28,904
2 Claims. (Cl. 82—14)

The invention relates to metal turning and cutting equipment and more particularly to a novel machine readily adaptable to a wide range of machining operations and is a division of our copending application, Serial No. 637,810, filed February 1, 1957, and now abandoned.

In the metal turning art today and particularly with regard to equipment such as laths, vertical turret laths or vertical boring mills, it is advantageous from the standpoint of the user to have a machine that is readily adaptable to many types of turning and cutting operations. Considering the vertical boring mill particularly, the machines heretofore known in that art were able to accomplish such machining operations as thread chasing, drum scoring, angle turning and boring or taper turning, and tracer controlled contouring, but each required a separate cumbersome attachment to accomplish the given operation. In many circumstances, particularly that known in the art as the job shop operation where each work piece would likely be different from the one previously set up in the machine, the difficulties attached to changing the machine set up for a different operation involved unreasonable expense and loss of production time.

With the above in mind, it is a general object of the invention to provide a new design of metal cutting machine affording a wide range of machine operations with a minimum of difficulty in changing from one operation to the other.

An object of the invention is to provide means to enable the machine operator to easily and quickly adjust the position of a tracer head attachment relative to a template.

FIGURE 1 is a perspective view of a boring mill as set up for tracer controlled contouring; and FIGURE 2 is a vertical sectional view through the tracer finger adjusting means.

The base 2 of a typical boring mill is additionally provided with vertical guides 8 which serve to guidably mount a vertically movable rail indicated generally at 10. The rail 10 is provided with the usual guides (not shown) which serve as a mounting for the horizontally movable rail heads 14 and 16. Directing attention to the rail head 14, it will be seen that it comprises a swivel 18 having limited rotation about a horizontal axis for adjustment in the usual manner, said swivel being adapted to receive a ram 17, which is movable in a generally vertical direction depending on the particular position of the swivel. The rail head 16, on the other hand, is provided with a turret head 20, said turret head being operable to hold a plurality of tools which operate on the work in the conventional manner. A side head 22 is also mounted on the base and is movable both vertically and horizontally relative to the work table 4. As will be well understood by those skilled in the art, the mill may be equipped with a ram, turret, and side head or any combination thereof depending on the machining requirements of the particular user.

In many applications it is desirable to operate the machine under tracer control from a template. The tracer control is utilized generally where quantity production of a given article is desired. In boring mills currently in use in the trade, tracer control is usually provided by either a hydraulically controlled tracing mechanism which is added to the machine as a separate attachment or by an electrically controlled arrangement which is also added to the machine as a distinct attachment. As will be well understood by those skilled in the art, a tracer unit has a follower thereon designed to engage and move along the contour of a template and thus control the operation of independent hydraulic motors which may be directly connected to the cross feed screw and down feed rod of the mill. In the electrically operated tracing arrangement variable speed motors are connected to the rod and screw direct or through magnetic clutches which engage and disengage in response to the template controlled movements of a tracer finger. The tracer initiates the engagement and disengagement of the magnetic clutches or varies the speed of the motors whereby motion of the particular associated motor is transmitted to the rod or screw.

Referring to FIGURE 1, it is seen that the tracer control comprises a tracer head indicated generally at 480 mounted for vertical and horizontal adjusting movement on a support housing 482 which is secured to the rail head ram 17 for movement therewith. The tracer control may just as readily be mounted on the side head ram and if so mounted, would function in the same manner as in the presently disclosed embodiment.

The tracer head 480 is not shown or described in detail because it is a conventional unit, such as manufactured by the Pratt and Whitney Machine Tool Company and is of the type wherein an arm mounted tracer finger or stylus rocks the arm in response to a template contour causing the arm to make and break electrical contacts in the tracer head thereby energizing and de-energizing certain of the above-described electro-magnetic clutches of the boring mill in a sequential pattern so that the template contour will be reproduced by a tool on the work piece.

Projecting downwardly from the support housing 482 are a pair of adjusting shafts 484 and 486 which, when rotated, adjustably move the arm assembly 488 together with the stylus 331 in a horizontal and vertical direction, respectively. These adjustments are necessary so that the stylus may be positioned relative to the template exactly as the tool is located relative to the table mounted work piece.

Shafts 484 and 486 are received in a telescoping arrangement in hollow shafts 490 and 492, respectively (FIGURES 1 and 2), for axial movement relative thereto and are keyed or splined therein for rotary movement therewith. The telescoping arrangement of the shafts accommodates relative movement of the ram 17 and the swivel 18.

The shafts 490 and 492 are supported at their upper ends by a bearing bracket 494 secured to the swivel 18. The lower ends of the shafts 490 and 492 are received in a gear box 496. Keyed to the shaft 490 for rotation therewith is a bevel gear 498, (FIGURE 2) the teeth of which are meshed with the teeth of a bevel gear 500 which is keyed to a stud shaft 502. The stud shaft 502 is bearing mounted in the gear box 496 and extends outwardly thereof to mount a dial indicator assembly 504. Similarly, the shaft 492 carries for rotation therewith a bevel gear 506 meshed with a bevel gear 508 keyed to shaft 510. The shaft 510 is bearing mounted in the gear box 496 and extends outwardly thereof to mount a dial indicator assembly 512. The above described arrangement enables the machine operator to adjust the position of the tracer head from an easily accessible position, and the dial indicators function to indicate the amount of movement of the stylus in either a horizontal or a vertical direction.

We claim:
1. In combination, a machine tool comprising: a rail head movable along a path of travel; a tool carrying member carried by said rail head and movable perpendicularly to the path of travel of said rail head; means for moving said rail head and said tool carrying member; a tool carried by said member; a rotatable table adapted to support a work piece to be engaged by said tool; a template; a tracer mechanism carried by said tool carrying member and including a stylus operatively associated with said template to control the movement of said rail head and said tool carrying member; and stylus adjusting means for locating said stylus with respect to said template, said means including a first adjusting shaft extending from said tracing mechanism and adapted to move said stylus in a horizontal direction, a second adjusting shaft extending from said tracer mechanism substantially parallel to said first adjusting shaft and adapted to move said stylus in a vertical direction, a pair of hollow shafts in telescopic keyed relation to said first and second adjusting shafts respectively for axial movement relative thereto and rotational movement therewith, a gear box mounted on said rail head, the free ends of said hollow shafts being received in said gear box, gear means in said gear box for operating said hollow shaft, and indicator means carried by said gear box and responsive to said gear means to indicate the horizontal and vertical position of said stylus.

2. A stylus adjusting means for use in cooperation with a boring mill having a rail head movable along a path, a tool carrying member carried by said rail head and movable along a path angularly related to said first mentioned path, means for moving said rail head and tool carrying member, a rotatable table adapted to support a work piece, a template, and a tracer mechanism, said tracer mechanism being carried by said tool carrying member and including a stylus operatively associated with said template to control the movement of said rail head and said tool carrying member; said stylus adjusting means comprising a first adjusting shaft extending from said tracer mechanism and adapted to move said stylus in a horizontal direction, a second adjusting shaft extending from said tracer mechanism in substantially parallel relation to said first adjusting shaft and adapted to move said stylus in a vertical direction, a pair of hollow shafts in telescopic keyed relation to the said first and second adjusting shafts respectively for axial movement relative thereto and rotational movement therewith, a gear box mounted on said rail head, the free ends of said hollow shafts being received in said gear box, gear means in said gear box for operating said hollow shaft, and indicator means carried by said gear box to indicate the horizontal and vertical position of said stylus.

References Cited in the file of this patent
UNITED STATES PATENTS

| | | |
|---|---|---|
| 2,540,186 | Bullard | Feb. 6, 1951 |
| 2,796,793 | Addison et al. | June 25, 1957 |
| 2,942,509 | Foster | June 28, 1960 |

FOREIGN PATENTS

| | | |
|---|---|---|
| 433,596 | Italy | Apr. 10, 1948 |